(12) United States Patent
Johnson

(10) Patent No.: US 7,849,020 B2
(45) Date of Patent: Dec. 7, 2010

(54) METHOD AND APPARATUS FOR NETWORK TRANSACTIONS

(75) Inventor: Bruce E. Johnson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/376,535

(22) Filed: Mar. 15, 2006

(65) Prior Publication Data

US 2006/0235761 A1    Oct. 19, 2006

Related U.S. Application Data

(60) Provisional application No. 60/672,754, filed on Apr. 19, 2005.

(51) Int. Cl.
*G06Q 20/00* (2006.01)
*G06Q 30/00* (2006.01)

(52) U.S. Cl. .................. 705/64; 705/14.23; 707/607; 726/9; 38/255; 713/185

(58) Field of Classification Search ............. 705/64, 705/14.23
See application file for complete search history.

(56) References Cited

U.S. PATENT DOCUMENTS

| | | | |
|---|---|---|---|
| 4,906,826 A | | 3/1990 | Spencer |
| 5,671,279 A | * | 9/1997 | Elgamal ................. 705/79 |
| 5,724,424 A | | 3/1998 | Gifford |
| 5,790,677 A | * | 8/1998 | Fox et al. ............... 705/78 |
| 5,812,668 A | * | 9/1998 | Weber .................... 705/79 |
| 5,892,900 A | | 4/1999 | Ginter et al. |
| 6,105,862 A | * | 8/2000 | Pailles et al. ........... 235/375 |
| 6,108,644 A | * | 8/2000 | Goldschlag et al. ...... 705/69 |
| 6,327,578 B1 | * | 12/2001 | Linehan ................. 705/65 |
| 6,434,238 B1 | | 8/2002 | Chaum et al. |

(Continued)

FOREIGN PATENT DOCUMENTS

RU    2182725 C1    5/2005

(Continued)

OTHER PUBLICATIONS

"SET Secure Electronic Transaction Specification Book 1: Business Description version 1.0." May 31, 1997. All pages. Retrieved via Wayback Machine on Jan. 19, 2010. http://www.setco.org/.*

(Continued)

*Primary Examiner*—Evens J Augustin
*Assistant Examiner*—Calvin K Cheung
(74) *Attorney, Agent, or Firm*—Wolf, Greenfield & Sacks, P.C.

(57) ABSTRACT

A method is provided to authorize an online transaction between a purchaser and a merchant. The method includes providing, via an identity provider, verification of an identity of the purchaser. The method also includes providing, via a payment provider, verification of an ability of the purchaser to pay for the transaction, where the identity provider and the payment provider are different network entities. A computer system is also provided that can conduct an online transaction between a purchaser and a merchant providing one or more goods and/or services. The computer system includes a first node configured to provide verification of an identity of the purchaser, and a second node configured to provide verification of an ability of the purchaser to pay for the transaction, where the first node and the second node are associated with different network entities.

8 Claims, 6 Drawing Sheets

U.S. PATENT DOCUMENTS

| | | | |
|---|---|---|---|
| 6,731,731 | B1 | 5/2004 | Ueshima |
| 6,792,536 | B1* | 9/2004 | Teppler ............... 713/178 |
| 6,799,155 | B1 | 9/2004 | Lindemann |
| 7,003,789 | B1 | 2/2006 | Linehan |
| 7,107,620 | B2 | 9/2006 | Haverinen |
| 7,133,920 | B2 | 11/2006 | Tsujisawa |
| 7,152,045 | B2 | 12/2006 | Hoffman |
| 7,171,694 | B1 | 1/2007 | Jespersen et al. |
| 7,203,158 | B2 | 4/2007 | Oshima et al. |
| 7,366,703 | B2 | 4/2008 | Gray et al. |
| 7,555,460 | B1* | 6/2009 | Barkan ............... 705/39 |
| 7,624,267 | B2 | 11/2009 | Huang et al. |
| 2001/0051902 | A1* | 12/2001 | Messner ............... 705/26 |
| 2002/0032663 | A1* | 3/2002 | Messner ............... 705/72 |
| 2002/0120563 | A1* | 8/2002 | McWilliam et al. ......... 705/39 |
| 2002/0123972 | A1* | 9/2002 | Hodgson et al. ............ 705/72 |
| 2002/0129088 | A1 | 9/2002 | Zhou et al. |
| 2002/0138445 | A1* | 9/2002 | Laage et al. .............. 705/67 |
| 2002/0147820 | A1 | 10/2002 | Yokote |
| 2003/0005290 | A1 | 1/2003 | Fishman et al. |
| 2003/0014363 | A1 | 1/2003 | Sethi |
| 2003/0061172 | A1 | 3/2003 | Robinson |
| 2003/0069792 | A1* | 4/2003 | Blumenthal ............... 705/16 |
| 2003/0163423 | A1 | 8/2003 | Holst-Roness |
| 2004/0030645 | A1 | 2/2004 | Monaghan |
| 2004/0162790 | A1* | 8/2004 | Fussell ............... 705/77 |
| 2004/0180657 | A1 | 9/2004 | Yaqub et al. |
| 2004/0249750 | A1 | 12/2004 | Granzer |
| 2005/0114261 | A1 | 5/2005 | Lin |
| 2005/0278547 | A1 | 12/2005 | Hyndman et al. |
| 2006/0020550 | A1 | 1/2006 | Fields |
| 2006/0048236 | A1 | 3/2006 | Multerer |
| 2006/0218396 | A1 | 9/2006 | Laitinen et al. |
| 2007/0055873 | A1 | 3/2007 | Leone et al. |
| 2008/0046988 | A1 | 2/2008 | Baharis et al. |

OTHER PUBLICATIONS

"SET Secure Electronic Transaction Specification Book 2: Programmer's Guide version 1.0." May 31, 1997. All pages. Retrieved via Wayback Machine on Jan. 19, 2010. http://www.setco.org/.*

"SET Secure Electronic Transaction Specification Book 3: Formal Protocol Definition version 1.0." May 31, 1997. All pages. Retrieved via Wayback Machine on Jan. 19, 2010. http://www.setco.org/.*

"External Interface Guide to SET Secure Electronic Transaction." Sep. 24, 1997. All pages. Retrieved via Wayback Machine on Jan. 19, 2010. http://www.setco.org/.*

Derfler, F. J. and Freed, L., "How Networks Work", Bestseller Edition, 1996, Ziff-Davis Press, Emeryville, CA, 69 pages.

White, R., "How Computers Work", Millennium Edition, 1999, Que Corporation, Indianapolis, IN, 83 pages.

Gralla, P., "How the Internet Works", Millennium Edition, 1999, Que Corporation, Indianapolis, IN, 36 pages.

Muller, N. J., "Desktop Encyclopedia of the Internet", 1999, Artech House Inc., Norwood, MA, 51 pages.

"The Bank Credit Card Business", American Bankers Association, 1996, 246 pages.

Office Action mailed Sep. 2, 2008 in U.S. Appl. No. 11/379,133.
Office Action mailed Mar. 4, 2009 in U.S. Appl. No. 11/379,133.
Office Action mailed Aug. 25, 2009 in U.S. Appl. No. 11/379,133.
Office Action mailed Dec. 9, 2009 in U.S. Appl. No. 11/379,133.
Office Action mailed Jan. 22, 2010 in U.S. Appl. No. 11/379,143.
Office Action mailed Jun. 22, 2010 in U.S. Appl. No. 11/379,143.

* cited by examiner

METHOD AND APPARATUS FOR NETWORK TRANSACTIONS

RELATED APPLICATIONS

This application claims the benefit under 35 U.S.C. §119 (e) of U.S. Provisional Application 60/672,754 filed Apr. 19, 2005, entitled "METHODS AND APPARATUS FOR NETWORK TRANSACTIONS," by Johnson, which is incorporated herein in its entirety.

FIELD OF INVENTION

The present invention relates to networked transaction systems and methods for conducting online transactions.

BACKGROUND

The proliferation of networked computer systems has opened up new possibilities with respect to how corporations and individuals conduct business. For example, end-users connected to a network, (e.g., the Internet), via a networked device such as a computer, PDA, cellular phone, etc., may conduct commercial transactions over the network to purchase services and/or merchandise, conduct financial transactions, or otherwise conduct business or perform personal transactions over the network. An inherent problem linked with online transactions is security, particularly when the transfer of moneys, funds and/or financial, personal or other confidential information is involved in the transaction.

Many conventional online transactions are conducted according to one of two different, but related, models. Both models employ a browser as the interface for handling information transfer between parties involved in the transaction. In the first model, a merchant offers goods or services online via a browser. The term "merchant" refers herein generally to any entity offering goods and/or services for purchase. The term merchant is not used to describe any particular commercial status or to describe a licensed seller, unless specifically stated. Rather, the term describes generically any seller or entity offering good and/or services for purchase or sale. The term service provider is used herein interchangeably with the term merchant and, unless otherwise stated, have the same meaning.

In a conventional online transaction, a merchant may have a website that describes, displays or otherwise offers goods and/or services for sale. An end-user indicates a desire to purchase one or more goods or services, typically by selecting the item via the browser interface. The browser then displays a transaction page that allows the end-user to select one or more payment types and to input information needed to complete the transaction. For example, the transactional page displayed by the browser may permit the end-user to select a payment type, such as credit card (e.g., VISA, MasterCard, American Express, etc.) and to input transactional information such as credit card number, card expiration date, etc. The transactional page may also query the end-user for personal information such as name, billing address, shipping address, etc. The end-user then submits the information and the merchant processes the submitted information.

In this first model, the merchant typically "owns" the website. That is, the merchant maintains the website, is responsible for the content, and receives and processes the transactional information provided by the end-user. The merchant may establish an account with the end-user before conducting the first transaction and the end-user may then access that account via a user established login and password each time the end-user conducts a transaction with the merchant. That is, the end-user typically chooses a login name and a password to be used in subsequent sessions or transactions. After the end-user has submitted the information queried by the transactional page(s), the merchant processes the information to make sure the information is sufficient to complete the transaction. For example, the merchant may ensure that the credit card number is valid and has sufficient funds to cover the cost of the goods and/or services.

The second model typically includes a third party transaction provider that handles the payment portion of the transaction. The third party forms a relationship with both the end-user and the merchant. In particular, the end-user may establish an account with the third party that can be accessed via a login and password as discussed above. To establish the account, the end-user may provide personal and payment information to the third party (i.e., the end-user may provide personal information identifying the user and payment information such as one or more credit card numbers, expiration dates, etc.) The end-user may also establish an electronic funds account by providing money to the third party transaction provider, the balance of which can be used to purchase online goods and/or services. The third party archives the account information provided by the end-user and/or maintains the end-user's balance.

The third party also establishes a relationship with the merchant, wherein the third party handles the payment processing of the transaction. In particular, the third party agrees to make payments to the merchant when an end-user with an account requests a transfer of funds to make a purchase. The merchant may provide the option of using the third party by signaling the availability of this option on its website where the goods and services are being sold. For example, when a user visits a merchant's website and decides to make a purchase, the user may then be presented with an option to pay for the purchase using the third party transaction provider.

When the end-user selects the option to pay for the purchase using the third party transaction provider, the end-user's browser is redirected to a website belonging to the third party transaction provider. The end-user then logs into his/her account via the login/password combination and selects a payment type (e.g., credit card) to use in the transaction, or requests a transfer of funds from the user's funds account to the merchant's account. Once the merchant determines that payment has been transferred appropriately by the transaction provider, the merchant can proceed to ship the purchased product or provide the purchased service to the end-user. In the second model, the third party is responsible for maintaining end-user personal and financial information and for processing the transaction.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

SUMMARY OF THE INVENTION

Figure 1:
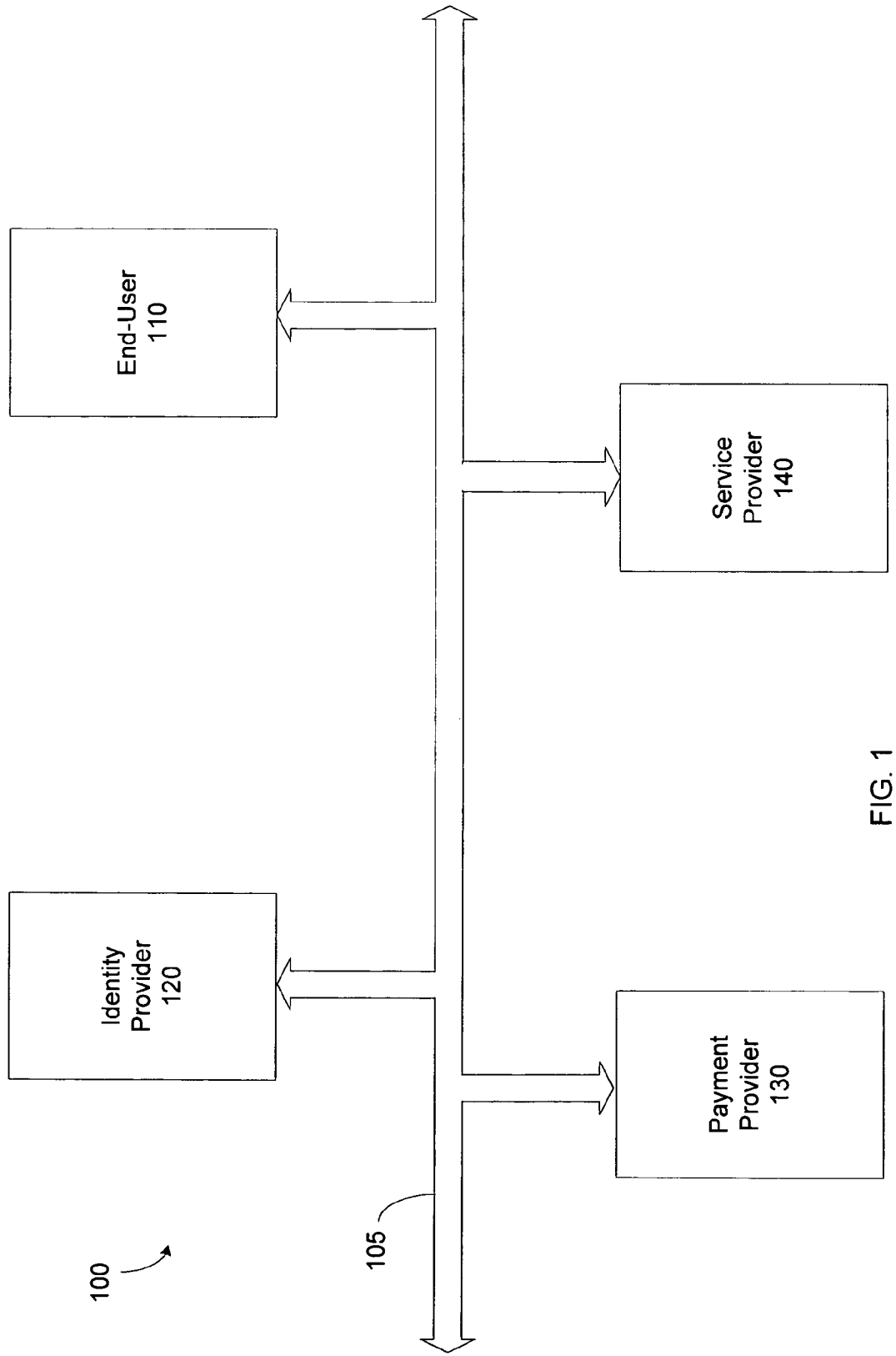
FIG. 1 illustrates a block diagram of a networked computer system for performing online transactions, in accordance with one embodiment of the invention.

Conventional online transactions, for example, the purchase of goods and/or services over a network, are vulnerable to security breaches resulting in loss of personal, financial and/or other confidential information. Moreover, in an untrusted network (e.g., the Internet), both merchants and purchasers are at risk for entering into a transaction with a bad actor such that one side of the bargain is not upheld. Conventional online transaction models may also require a merchant to archive purchaser's confidential information and may require them to handle payment aspects of the transaction. In addition, conventional online transaction models are awkward for the purchaser and produce a generally unintuitive transaction experience. For example, conventional online transactions are conducted via a browser using a login/password paradigm that is confusing and difficult to manage.

Applicant has identified and appreciated that delegating at least some of the transactional responsibilities handled by the purchaser and browser in conventional models to lower level systems (and away from the browser and end-user), may facilitate a simpler and more secure online commercial transactions framework. For example, one or more transactional tasks may be handled by the operating system at one or both of the end-user and merchant, where information may be more securely safeguarded. By embedding one or more tasks in the operating system, users may be relieved of some of the burden of transferring transactional information, making the experience more intuitive and enhancing security. Moreover, the merchant may be relieved of maintaining purchaser information, handling of payment information and/or processing the transaction.

Applicant has further appreciated that problems associated with validating the identity of a purchaser may be mitigated by exploiting technologies more secure and convenient than the login/password model. In one embodiment, identity information about a purchaser is provided by a subscriber identity module (SIM) card which stores identity information about the end-user that can be issued programmatically, creating a less confusing and more straightforward purchasing experience.

Applicant has further appreciated that providing various transactional elements of online commercial transactions using generally disinterested third parties mitigates risks involved for both the purchaser and the merchant. In one aspect of the invention, a commercial transaction system is provided wherein a first network entity provides verification of a purchaser's identity and a different network entity provides verification of a user's ability to pay for the purchase, such that a merchant and a purchaser that are strangers to one another may conduct a transaction in relative security.

DETAILED DESCRIPTION

Conventional models for networked commercial transactions focus on the browser as the interface for requesting and submitting personal and financial information between an end-user purchaser and a merchant or service provider, whether it be directly through the merchant or via a third party transaction provider. In the first instance, the merchant is burdened with creating and maintaining an infrastructure capable of querying, obtaining, handling and processing personal and financial information, typically with some minimum level of security. Moreover, the merchant may be responsible for maintaining accounts and account information for each of its customers (which typically includes both confidential personal and financial information).

A purchaser must relinquish personal information (e.g., name, address, phone number, etc.) and financial information (e.g., debit and credit card numbers and expiration dates, banking account numbers, etc.) to complete a transaction. At some level, the purchaser must trust that the merchant is an honest broker and will operate in good faith, using the information only as authorized. Likewise, a merchant must trust that a purchaser is who he/she represents and that the payment information provided is truly associated with the end-user making the purchase. There may be no sure way for a merchant to validate the identity of the purchaser and/or the validity of the payment information. In a distributed networked environment, purchasers may have to rely on the reputation of the merchant, which may limit the sources from which the purchaser is willing to conduct transactions. The merchant may have to operate with even less conviction that the purchaser is a good faith, bone fide purchaser. In an untrusted network, this model may present undue risks on one or both parties.

Even when an established and merited trust has developed between a purchaser and a merchant, databases storing customer information maintained by the merchant may be susceptible to hacking, information theft and even bad actors within an otherwise honest and trustworthy business. Third party transaction providers are also susceptible to electronic theft, security breaches, etc. More sophisticated "spy-ware" programs allow hackers to record keystrokes and obtain screen shots of computers that have been compromised, making browser based transactions particularly vulnerable to electronic theft. Accordingly, purchasers conducting online commercial transactions according to conventional methods and models may be vulnerable to dissemination and unauthorized use of their confidential personal and financial information.

Conventional commercial transaction models typically require a purchaser to establish an account with each merchant with which the purchaser wants to conduct a commercial transaction. Generally, the account is protected and accessed via a login name and password, requiring a purchaser to manage multiple login and passwords and maintain which login/password combination corresponds to which account. Some customers may resort to storing their login/password combinations locally on their computer, or using the same login/password combination for all accounts. Both attempts to manage multiple accounts are vulnerable to theft, hacking, and/or other security breaches.

For example, a customer is at risk of having all of his/her accounts breached should the single login/password combination be obtained by electronic theft. In addition to the inherent security risks associated with conventional login/password paradigms, purchasers may find the account login procedure an awkward transaction experience. In particular, having to login to an account when a purchase is desired makes the transaction less convenient, as a purchaser must, in one way or another, produce this information before a transaction can be completed. Moreover, with third party transaction providers, the purchaser is redirected from a merchant's website to the third party transaction provider's website. This step is not intuitive and, at best, is cumbersome and confusing to the purchaser.

Applicant has identified and appreciated that delegating at least some of the transactional responsibilities handled by the purchaser and browser in conventional models to lower level systems (and away from the browser and end-user), may facilitate a simpler and more secure online commercial transactions framework. In one embodiment, one or more transactional tasks are handled by the operating system at one or both of the end-user and merchant, where information may be more securely safeguarded. By embedding one or more tasks in the operating system, users may be relieved of some of the burden of transferring transactional information, making the experience more intuitive and enhancing security. Moreover, the merchant may be relieved of maintaining purchaser information, handling of payment information and/or processing the transaction.

Applicant has further appreciated that problems associated with validating the identity of the user may be mitigated by exploiting technologies more secure and convenient than the login/password model. In one embodiment, identity information about a purchaser is provided by a subscriber identity module (SIM) card which stores identity information about the end-user that can be issued programmatically. In another embodiment, identification information is provided by a smart card embedded or otherwise coupled to a network device from which a purchaser conducts an online commercial transaction. Use of any of various chip or card based identity means allows a purchaser to link his or her identity with a particular device, such as a cellular phone or a networked computer.

The term "programmatically" refers to actions performed substantially without manual or operator involvement. In particular, programmatic refers to actions initiated and/or performed by one or more computer programs. For example, providing identification information by requesting a user (e.g., purchaser) to provide login and/or password information would not be considered programmatic as the substance of the action is performed by the user. However, an action wherein a program issues identification information (e.g., a SIM number, network address hardware ID, etc.) without requesting the user to input the information would be considered programmatic.

Applicant has further appreciated that distributing various transactional elements of online commercial transactions over different network devices, facilitates more secure commercial transactions over an untrusted network. In one embodiment, an identity provider and a payment provider, both separate and distinct network entities from the end-user, merchant and each other, provide verification support during a commercial transaction. The term "network entity" refers herein to a network presence and may be one or a combination of end-user/purchaser, identity provider, payment provider, merchant, etc. A network entity may have a presence on a network via one or multiple network nodes. For example, multiple networked devices may operate under the auspices of a single network entity, such as an identity provider utilizing multiple servers to conduct online business, or an end-user connected to a network via a cellular phone and a personal computer. A network entity may be a business such as a bank or retailer, or an individual such as an end-user.

In one embodiment, various elements of an online transaction are distributed over separate and independent network entities. For example, the identity provider may provide identity validation in the form of an identity token, which the merchant can use to verify the identity of the purchaser. The identity token may include one or more identity credentials of the end-user. The identity token may be issued based on the identity information provided by the end-user/purchaser, for example, the subscribe number from the SIM card, a network address (e.g., a Network Interface Card (NIC) identification, World Wide Name (WWN), etc.), login information, etc. Similarly, the payment provider may provide verification of the end-user's ability to pay in the form of a payment token. In addition, the payment provider may handle payment transactions on behalf of the purchaser in satisfaction of the purchase of goods and/or services from the merchant. The above described framework allows, inter alia, a purchaser and merchant that are strangers to conduct an online commercial transaction in an untrusted network environment in relative confidence, as discussed in further detail in the various exemplary embodiments provided below.

FIG. 1 illustrates a block diagram of a commercial transaction system 100, comprising a plurality of network nodes including an end-user (purchaser) computer 110, a merchant computer 140, an identity provider computer 120, and a payment provider computer 130. Each of the above nodes may include one or more computing devices interconnected via network 105. It should be appreciated that the end-user computer, merchant 140, identity provider 120 and payment provider 130 may be associated with a network entity, such as an individual, company or business. For example, end-user computer 110 typically is associated with an individual that employs the computer to access resources on the network and merchant computer 140 may be associated with a corporation or business offering goods and/or services for sale. The one or more computing devices that form each mentioned component in commercial transaction system 100 may operate as the point of entry, computing platform and/or vehicle by which the associated network entities communicate over the network.

Network 105 may be any type of network in any type of configuration that interconnects and allows nodes connected to the network to communicate. Nodes or devices may be connected to the network via copper (e.g., Category 5) cable, optical connections, wireless or any combination thereof. Information may be transferred using any low level protocol such as Ethernet and/or any information protocol such as TCP/IP. The network 105 may have any number of devices connected to it and may be a trusted (e.g., intranet) or an untrusted network (e.g., LAN/WAN, Internet, etc.), or a combination of both. The computers connected to the network may be any type of device including, but not limited to, one or any combination of a mobile phone, a desktop computer, a tablet personal computer, a server, workstation, etc.

Figure 2:
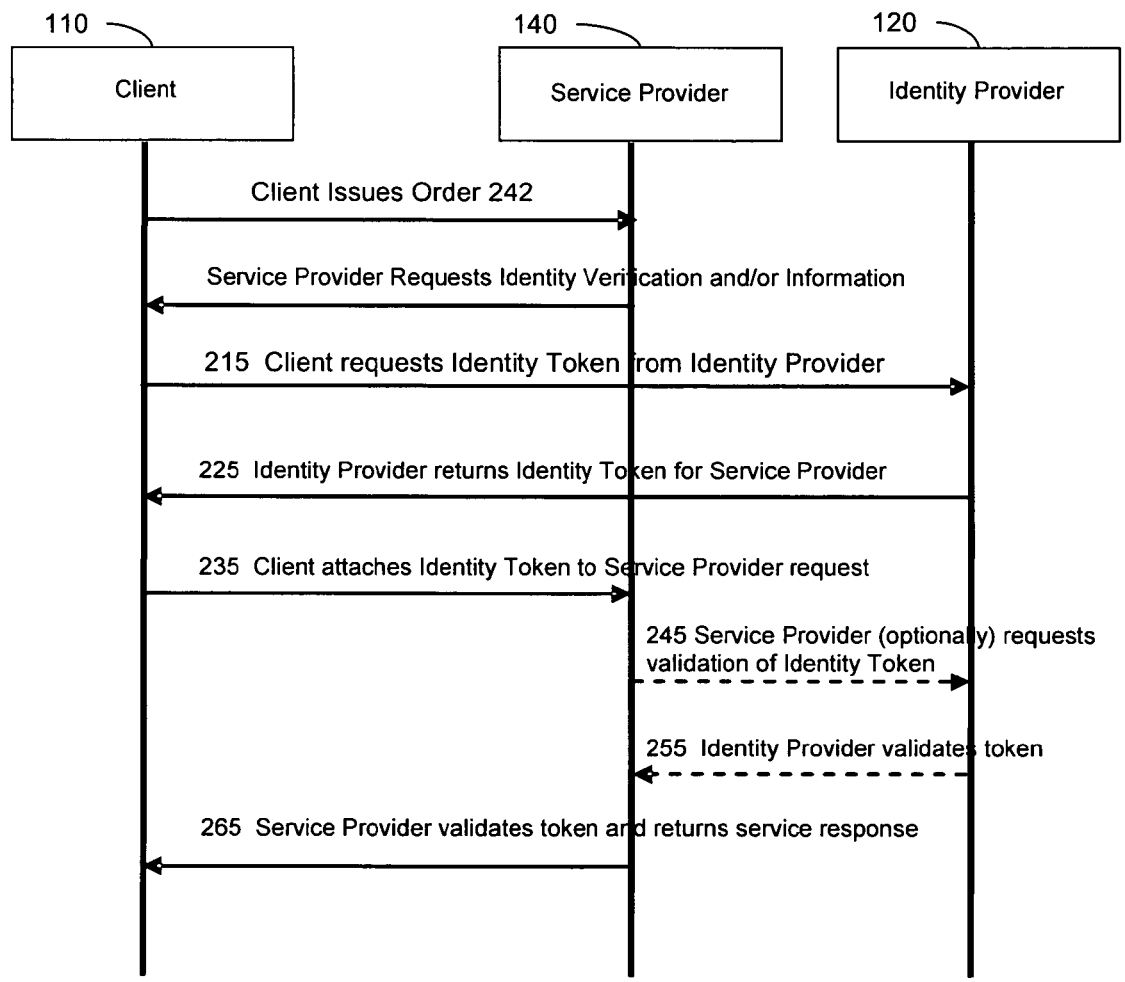
FIG. 2 illustrates a diagram of a system and method for initiating and performing identity verification in an online transaction, in accordance with one embodiment of the invention.
Figure 3:
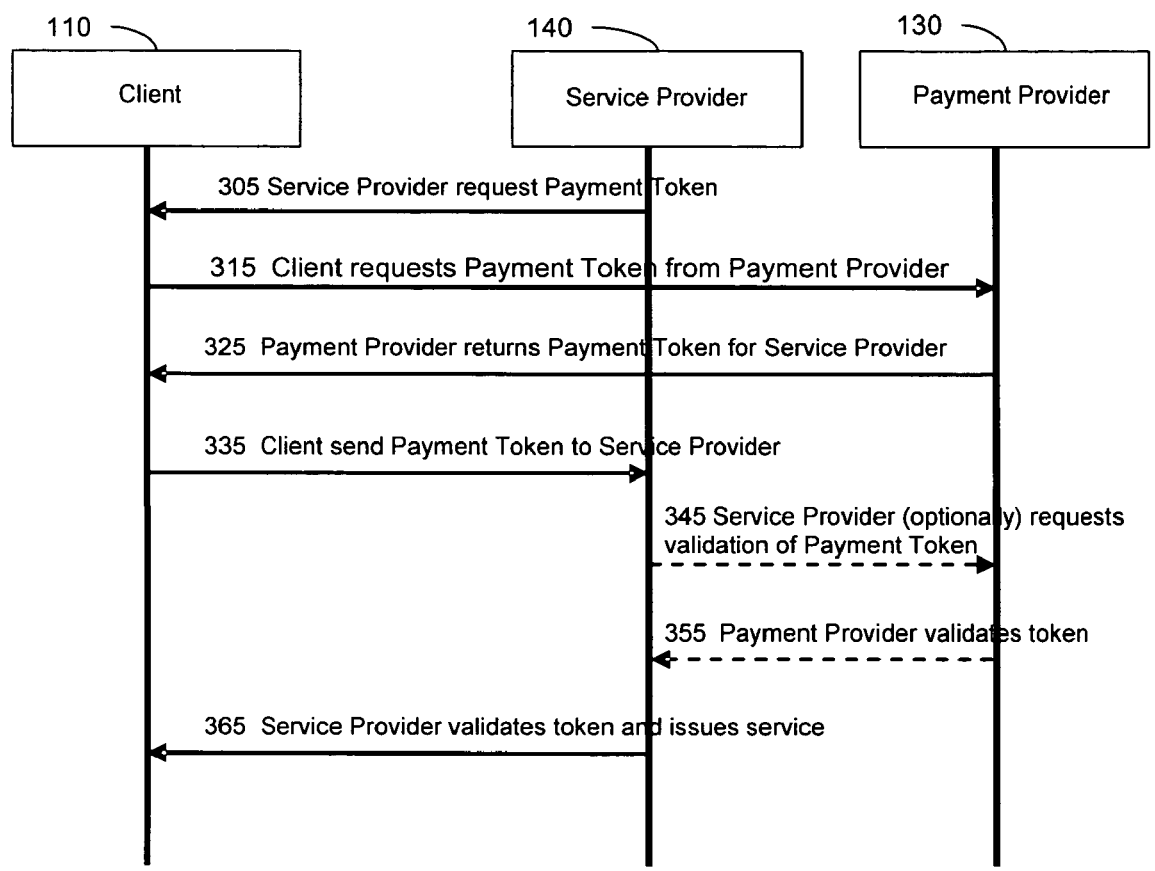
FIG. 3 illustrates a diagram of a system and method for performing payment negotiation, verification and/or certification in an online transaction, in accordance with one embodiment of the invention.

FIG. 2 illustrates a diagram of a system and method for initiating and performing identity verification in an online transaction, in accordance with one embodiment of the invention, and FIG. 3 illustrates a diagram of a system and method for performing payment negotiation, verification and/or certification in an online transaction, in accordance with one embodiment of the invention. The methods may be used separately or in combination to perform an online transaction between an end-user/purchaser and a merchant. In the following description, unless specifically pointed out, no distinction is made between the network entity and its associated networked devices. For example, "identity provider" is used generically to describe the identity provider as an entity (e.g., a bank, government organization, agency, etc.) and as the computing devices that the entity utilizes to perform various network functions, such as providing identity verification for an end-user, or otherwise operating on the entity's behalf.

An end-user computer 110 may place an order 242 with a merchant 140. The order 242 may be any indication that the end-user would like to purchase one or more goods and/or services from the merchant 140. For example, the order 242 may result from end-user selecting a good or service via a web browser displaying pages resident at the website of a merchant, or may result from choosing an option from an application running locally, as described in further detail below. As an example of the first instance, the merchant 140 may provide a website to display or otherwise offer for sale goods and/or services that it provides, or may provide an online catalog of merchandise. The order 242 may be any type of indication that end-user would like to purchase one or more goods and/or services from the merchant 140.

As an example of the second instance and as an alternative to selecting one or more goods and services from a merchant's website, order 242 may originate from an application or other program local to the end-user computer 110. For example, an end user may create, produce or edit a document via a word processing application, design a slide show using a presentation application and/or manipulate images or graphics for a poster or brochure using an imaging application. The application may include an option under the print menu that allows the document to be printed by a third party to, for example, take advantage of printing features that may not be locally available, or to otherwise exploit professional printing services. When the option is selected, the application may send, via the network, order 242 to the merchant 140. It should be appreciated that order 242 may be any indication to purchase any good and/or service, as the aspects of the invention are not limited in this respect.

In response to order 242, merchant 140 may request that end-user 110 provide an indication of the end-user's identity and/or verification that the end-user is indeed who he/she purports to be (step 205). For example, merchant 140 may not know anything about the source of order 242 and may desire information about the identity of the end-user and/or assurance that the end-user is not spoofing his/her identity. Alternatively, the merchant 140 may send a notice or indication that payment is required for the service and demand that a payment token be provided. To obtain a payment token, it may be necessary to first establish an identity via an identity token, as described in further detail below. In either case, end-user 110 may respond to the request by the merchant 140 by enlisting the services of identity provider 120 (step 215).

To obtain an identity token, end-user 140 provides identity information to identity provider 120. Identity information may include any information that enables the identity provider 120 to distinguish between end-user utilizing end-user computer 110 and the various other end-users to which identity provider may provide services. For example, the identity information may include a unique identifier associated with the hardware of end-user computer 110. In one embodiment, the identity information is provided by a SIM card issuing an identifier unique to the subscriber. Identity information may include providing a unique hardware number of the network interface card (NIC) of the end-user computer 110, a world wide name (WWN) or other network address of end-user computer 110 or any other means by which end-user computer 110 may be identified, including (in some embodiments) an established login name/password combination.

Identity provider 120 uses the identity information to locate identity credentials associated with the end-user. For example, identity provider 120 may include a database that stores identity information and credentials on a plurality of end-users. The identity information may be used to index into the database to obtain the correct identity credentials. The identity provider 120 may be any type of entity. For example, identity provider 120 may be a mobile phone company that uses the subscriber number provided by the end-user's SIM card to locate the appropriate identification information. In one embodiment the subscriber number is used to locate and obtain information provided by the end-user at the time of subscription to the cell-phone or other device exploiting SIM technology. The identity provider 120 may be a bank, a government agency (such as the registry of motor vehicles (RMV)), or any other facility that maintains identification information or credentials associated with end-users.

In response to the identity information provided by the end-user, identity provider 120 provides an identity token to end-user computer 110 that provides identity authentication and/or credentials about the end-user (step 225). The identity token may be any type of electronic message that another network device can use to authenticate, verify and/or determine an end-user's identity. For example, the identity token may include identity credentials of the end-user. Identity credentials may include, but are not limited to, any one of or combination of name, birth date, address, telephone number, email address, etc.

The identity token may include an electronic signature from the identity provider 120 certifying that the identity credentials are correct. In this way, a merchant and/or payment provider may rely on a disinterested third party (i.e., an identity provider), rather than the representations of an arbitrary end-user. The identity token may be encrypted before being transmitted over the network and decrypted when received by the desired network device (e.g., merchant, payment provider, etc., as discussed in further detail below), to protect against eavesdroppers on the network. In other embodiments, the payment token is merely a certification of the end-user's identity without accompanying identity information.

The identity provider 120 may transmit the identity token to end-user computer 110 to forward to merchant 140 (step 235), and/or identity provider 120 may transmit the identity token directly to the merchant 140. Merchant 140 may then process the identity token to identify end-user and/or to verify that end-user is who he/she purports to be. The identity token may be used to authenticate certain information about the end-user that may affect the transaction. For example, the merchant 140 may provide a service that requires the end-user to be of a certain age. Identity credentials transmitted with the identity token may be used to ensure that the end-user is of the proper age and meets this requirement. Merchant 140 may have discounts for particular end-users that are frequent purchasers, or who received a coupon, promotional offer, etc. The merchant 140 may index a database of end-users to determine whether the end-user qualifies or should otherwise be specially handled based on the provided identity credentials.

Optionally, the merchant 140 may request validation of the identity token by sending a request to the identity provider 120 (step 245). The request for validation of the identity token may include forwarding the identity token from merchant 140 to identity provider 120. Upon receiving the request for validation of the identity token, the identity provider 120 may validate the identity token, and thereby determine whether the identity token is authentic. The identity provider 120 may then forward an indication of the validity of the identity token to the merchant 140 (step 255). Alternatively, the merchant 140 may simply validate the identity token itself (step 265) (e.g., by assuming the identity token is valid or otherwise processing the token). Optionally, a response may be returned from the merchant 140 to the end-user computer 110, where the response may include a message of whether the identity token is valid, of any applicable discount or promotional offers, and/or any other type of message, as the invention is not limited in this respect (step 265).

After the merchant 140 has processed the identity token and/or has received a validation for the identity token from the identity provider 120, the merchant 140 may request that the end-user provide verification or validation of an ability to pay and/or provide an indication of how the end-user would like to pay for the goods or services. The merchant 140 may make the request via a payment token request (step 305 in FIG. 3). In response to the payment token request, the end-user computer 110 may enlist the services of a payment provider 130. Payment provider 130 may be associated with a third party that maintains financial and payment information about various end-users, such as a financial institution, or a third party broker that handles financial transactions and payment procedures.

The end-user computer 110 may solicit a payment token from a payment provider 130 (step 315) by transmitting the identity token to payment provider 130. Alternatively, the end-user may request a payment token by logging onto the payment provider 130 in a manner similar to that discussed in connection with the identity provider 120 (i.e., by providing an identifier such as a SIM subscriber number, NIC address and/or using a login/password combination). It should be appreciated that the end-user may request a payment token in other ways, as the invention is not limited in this respect. In addition, the end-user may send information about the purchase, such as the price and nature of the purchase so that the payment provider can verify that the end-user is capable of paying. However, providing purchase information is not required, as it may not be necessary or it may be handled in subsequent steps of the transaction.

Payment provider 130 processes the identity token (or other provided identifier) to locate information about the end-user. For example, the payment provider 130 may access a database of payment information based on the identity credentials transmitted with the identity token. Payment provider 130 may determine what payment capabilities and options the identified end-user has available. The payment provider 130 may then verify that the end-user has the ability to pay, and in response generate and transmit a payment token to the end-user computer 110 (step 325). The payment token may indicate the end-user's ability to pay and/or a certification that the payment provider 130 is willing to handle the transaction on the end-user's behalf. The end-user computer 110 may then forward the payment token to the merchant 140 (step 335).

The merchant 140 processes the payment token such that the merchant 140 is satisfied that the end-user is able to pay for the goods or services (step 365). For example, the merchant 140 may ask the payment provider 130 to validate the payment token (steps 345, 355) or may simply validate it itself (step 365) (e.g., by assuming the payment token is valid or otherwise processing the token). The merchant 140 may then begin the process of providing the goods and/or services to the end user. Because the payment provider 130 may be a disinterested third party, merchant 140 may treat the payment token essentially as payment and may not have to wait until the transaction is fully processed.

When a merchant deals directly with the end-user in conventional transactional models, the merchant may have to ensure that the payment information provided by the end-user is correct and sufficient. For example, a merchant may have to run a provided credit card number through the credit card system to query whether the number is valid, the card is valid, there are sufficient funds and/or the card is correctly associated with the identity provided by the end-user. If something doesn't check out, the transaction may have to be canceled, terminated or abandoned. Moreover, the termination of the transaction may happen after the end-user perceives the transaction to be complete and is no longer accessing the network and/or is no longer accessing the merchant's website, etc.

The merchant may then have to notify the end-user that there was a problem with transaction and the end-user will have to go through the transaction again to correct the problem (e.g., by correctly inputting payment information, specifying a different card with sufficient funds, etc.). In some instances, the end-user may not be notified and the commercial transaction may never be completed.

In various embodiments discussed herein, because a payment token will not be issued unless the end-user payment information is correct, sufficient funds are available, and/or the payment provider otherwise certifies that it will pay on the end-user's behalf, the merchant can proceed with the transaction immediately. Any deficiencies in the transaction may be identified in real-time and addressed so that all parties can be relatively certain that there expectations are being met with respect to completion of the transaction.

In addition, because the payment provider may handle the financial transaction (e.g., handling the credit card, transferring funds, etc.), the merchant may be relieved of establishing and maintaining the infrastructure necessary to, for example, process credit card numbers or otherwise handle payment procedures and funds transfer. The payment token, in some cases, operates as an assurance that the payment provider will transmit the designated funds, for example, by wiring the money or enacting an electronic transfer of funds to the merchant. The payment token may also be an assurance that the payment will be made by non-electronic means such as a promise to issue to the merchant a check or other negotiable instrument.

From the perspective of the merchant, the commercial transaction is substantially risk free as the identity of the end-user and the payment verification is handled by third parties and is therefore less susceptible to fraud, spoofing and even innocent mistakes in providing personal and financial information. Therefore, merchants may be more willing to conduct online commercial transactions with unknown end-users over an untrusted network. From the perspective of the end-user, personal and financial information resides with entities either that already maintain the information and/or that the end-user has an established relationship with. Confidential personal and financial end-user information need not be provided to the merchant, mitigating the vulnerabilities of having confidential information misused or misappropriated. As a result, end-users may be more willing to conduct commercial transactions with unknown merchants without having to worry about whether the merchant is trustworthy or not.

In some conventional commercial transaction models, identity information and payment information are input by the user and processed by either a third party or the merchant. As discussed above, these models are awkward, inefficient and time consuming for the user. In addition, conventional models present numerous issues regarding security of an end-user's confidential information as well as making a merchant vulnerable to fraud and/or susceptible to failure to pay by an end-user. Applicant has appreciated that commercial transaction software installed on each of the computers employed in various commercial transactions may mitigate or eliminate concerns over security and fraud. In addition, many of the actions handled by the end-user and merchant in conventional models may be performed by the commercial transactions software, making the transaction simpler and more intuitive to the end-user.

Figure 4:
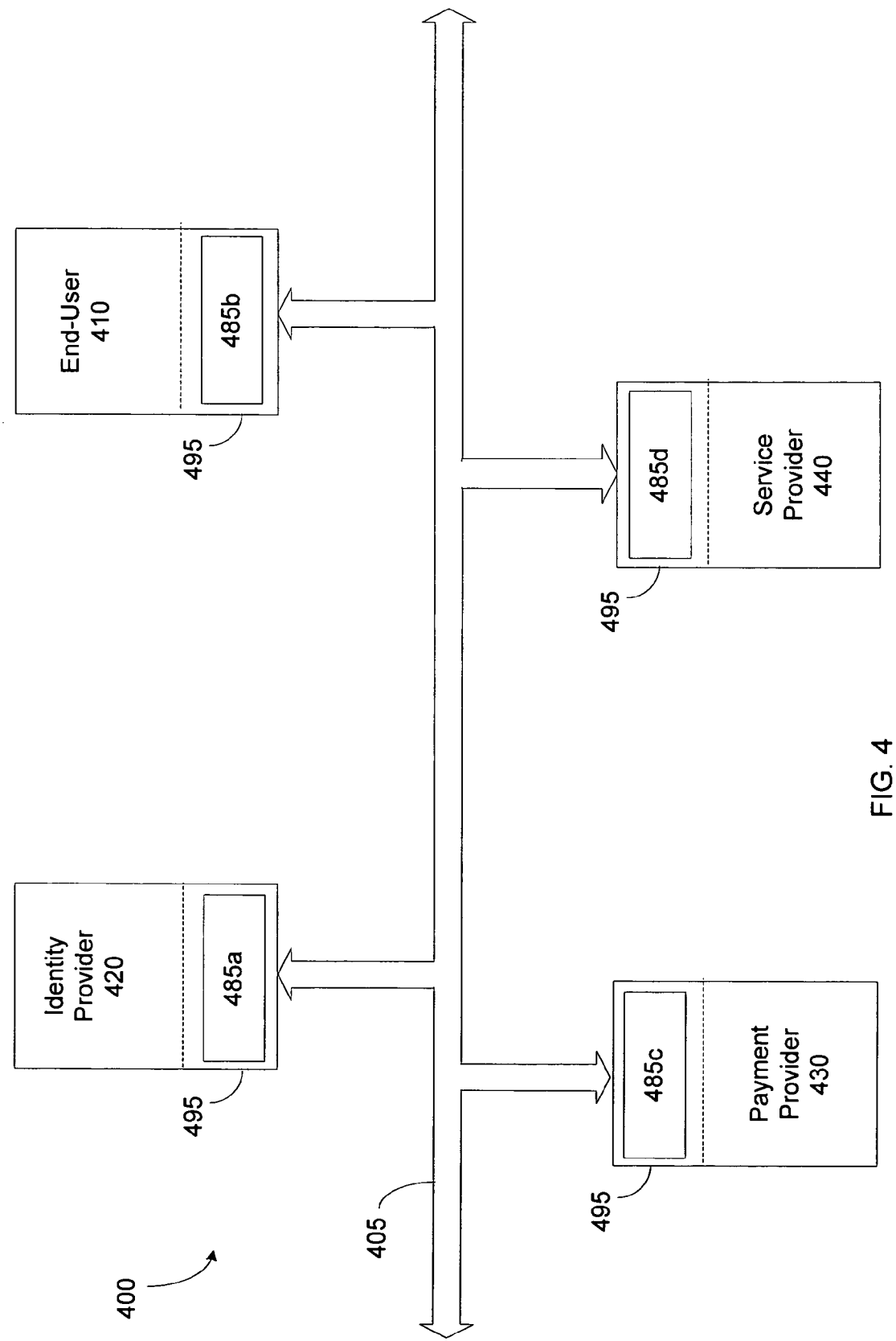
FIG. 4 illustrates a networked computer system for conducting online transactions, wherein transactions are handled, at least in part, by transaction software installed on computers connected to the network, in accordance with one embodiment of the present invention.

FIG. 4 illustrates a networked computer system for handling commercial transactions, in accordance with one embodiment of the present invention. Networked computer system 400 may be similar to computer system 100 illustrated in FIG. 1. However, in FIG. 4, each of computers in system 400 includes local installations of commercial transactions software 485. In particular, end-user computer 410, identity provider 420, payment provider 430 and merchant 440 include commercial transactions software 485a-485d, respectively. The commercial transactions software locally installed at each of the computers in the system may be the same, or may be customized for the particular computer in view of which role(s) the computer plays in the transaction (i.e., whether the computer operates as an end-user node, a merchant node, identity provider node, payment provider node, etc., or some combination of the above). In either case, each installation is configured to communicate with installations on other networked computers to perform online transactions. For example, each installation may be configured to communicate with installations on networked computers so as to perform the methods illustrated in FIG. 2 and/or FIG. 3.

In one embodiment, the local installation of the commercial transaction software 485a on identity provider 420 can create an identity token identifying the end-user utilizing end-user computer 410. Furthermore, the commercial transaction software 485a on identity provider 420 can forward the identity token to the end-user computer 410, the payment provider 430, the merchant 440, and/or any other computer, as the invention is not limited in this respect. The local installation of the commercial transaction software 485b on the end-user computer 410 can issue identity information (so as to identify the end-user) in response to an indication to conduct an online transaction between the end-user and a merchant. The local installation of the commercial transaction software 485c installed on payment provider 430 can receive the identity token and generate a payment token verifying an ability of the end-user to pay (e.g., the payment token) for the online transaction. The local installation of the commercial transaction software 485d installed on the merchant 440 can receive the verification of the ability of the end-user to pay before proceeding with the online transaction.

In one embodiment, each of the computers in system 400 operates using a local installation of a same or similar operating system 495. For example, each of the computers in system 400 may operate using the Microsoft Windows® operating system. Commercial transactions software 485 may be a subsystem of the operating system. In this way, the various computers employed in a commercial transaction communicate in a consistent and known fashion. Since the commercial transactions software is communicating directly over the network and handling the validation, verification and security, the end-user and merchant need not know anything about one another, and more importantly, may not need to establish any trust relationship. In addition, because certain portions of the transactions are handled by the operating system, much of the transaction may be performed substantially invisible to the user, without requiring confusing and often times awkward involvement by the end-user.

By having the commercial transactions software on each computer, various encryption techniques may be used during transmission of information from one computer to another. Moreover, further security features may be included such as identity tokens and/or payment tokens that are valid for a limited time period. For example, an identity token may include a time component that specifies a time after which any component receiving and processing the token should deem it invalid, and not honor the token as verification of identity and/or payment. The commercial transactions software components may programmatically process any time limits associated with a token. This may prevent tokens obtained by "fishing" from being used inappropriately at a later date.

It should be appreciated that the commercial transaction software need not be part of the operating system, but may be any program or group of programs local to computers involved in a commercial transaction that can communicate with one another over the network. For example, the commercial transaction software may be an application developed by a third party that can be installed on the computers to operate on or independent of the operating system installed on the computer. The application may be configured to operate with any one or combination of operating systems so as to be available to computers or devices of a wide range of capabilities and configurations, and not limited to any particular operating system, processor, instruction set, etc.

Figure 5:
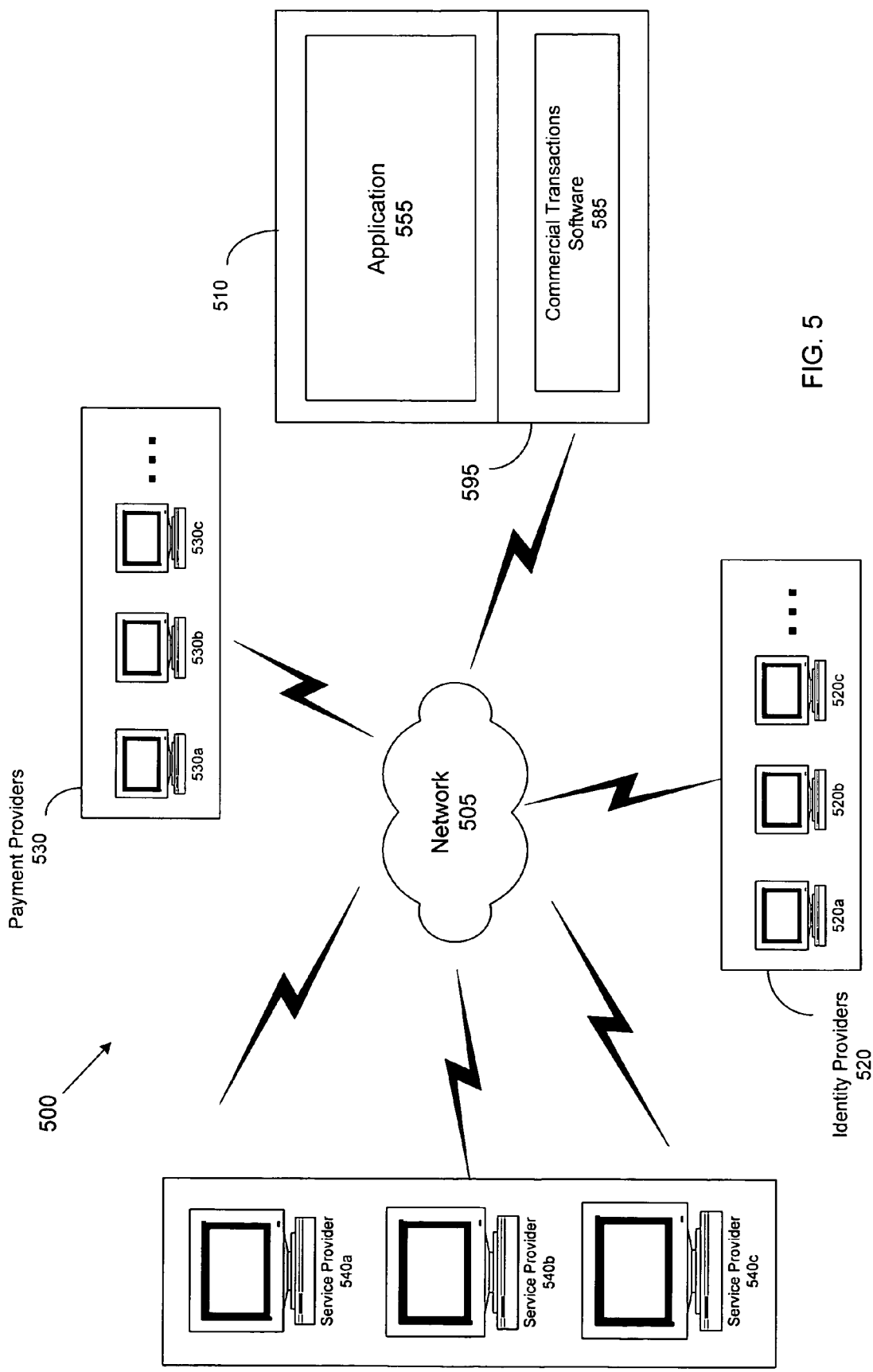
FIG. 5 illustrates a networked computer system for conducting online transactions, wherein transactions are handled, at least in part, by transaction software installed on computers connected to the network, in accordance with another embodiment of the present invention.

FIG. 5 illustrates a commercial transaction initiated by an end-user selecting one or more desired goods and/or services, wherein the transactional components of the purchase are handled, at least in part, by a transaction software subsystem distributed as part of the operating system of the various computers involved in one or more transactions. An end-user connected to network 505 through end-user computer 510 may be running an application 555. Application 555 may be a browser displaying the website of a business that offers merchandise or services for sale. Application 555 may be an application that provides an option to engage in an online transaction, such as an imaging editing program that allows users to manipulate images.

The end-user may select one or more goods or services to purchase via application 555. For example, the end-user may wish to have an edited image professionally printed on photo quality paper. Application 555 may include such an option under the print menu. The print option, when selected, may generate a window or dialog box listing all of the available printing options, including services available over the network. For example, the print option may list service providers 540a, 540b and 540c as options for providing the printing service. When the user selects one of the service providers, an online commercial transaction as described above may be initiated. In particular, the service provider may request that the end-user provide an identity token. In response, application 555 (or an application embedded in commercial transactions software 585), may generate a dialog box or interface listing available identity providers. For example, the dialog box may list identity providers 520a, 520b and 520c as possible identity providers that the user may select to handle identification verification.

In one embodiment, the selected service provider transmits any requirements to the identity provider with the request for identity verification. For example, service provider may be selling goods or services that require a minimum age or is restricted to a certain geographical location. Accordingly, the listing of identity providers may be limited to those that can provide identity credentials that satisfy the requirements of the service provider. For example, the list of identity providers may be restricted to those that can provide age verification or current address information, such as the RMV.

Likewise, a dialog box may be generated listing options for payment providers. For example, the dialog box may list payment providers 530a, 530b and 530c, which may include a credit card company, a bank offering electronic debit services, or a private third party offering financial services, respectively. As with the identity request, the selected service provider may include any payment requirements associated with the purchase. For example, the service provider may only accept a certain type of credit card. The payment requirements may then be reflected in the available payment providers listed or enabled in the payment provider selection dialog box. After a payment provider is selected, payment certification may proceed and the transaction may be completed.

In conventional online transactions, it may be difficult for both the end-user and/or the service provider to know for certain when a transaction is complete and whether the goods or services have been successfully delivered. For example, an end-user may select a software package for download over the network, or an end-user may purchase songs, movies or other electronic media. Sometimes a network connection may be disrupted before the download can be completed. Under such circumstances, the end-user may be tempted to select the merchandise again, but may be hesitant because the end-user does not know whether he or she will be double charged for the purchase. Likewise, the service provider may not know if a download was completed successfully and may double charge when a user attempts to remedy the disruption by selecting the merchandise again.

Applicant has appreciated that providing logging or auditing capabilities in the commercial transactions software may eliminate some of the uncertainties with respect to electronic downloads. For example, final execution of the payment option may depend on a signal from the auditing feature that the download is complete. That way, if a download is interrupted, the end-user can be certain that the selected payment option did not go through. For example, commercial transactions software 585 may include a logging feature that records all of the various steps of the commercial transactions conducted by the machine. The logging information may be used as proof of purchase or to otherwise memorialize transactions. In addition, commercial transactions software 585 may include monitoring capabilities for electronic downloads, which sends a verification of a successful download, only after which final payment will be made. By making payment contingent on a signal that the transfer of goods or services was completed successfully, issues of double billing may be addressed and substantially eliminated.

Software has been developed by companies to handle a wide variety of tasks including familiar word and document processing, spreadsheets, imaging editing, to more specialized tasks such as video editing, computer graphics software, web-content development applications, portfolio management software, etc. However, to own software that handles each task that an end-user may want to perform may be prohibitively expensive. Software packages can cost anywhere from hundreds to thousands to tens and even hundreds of thousands of dollars to obtain a single license. Moreover, an end-user may need the services of a particular application only occasionally or sporadically, such that the cost of purchasing the application may not be justified.

Figure 6:
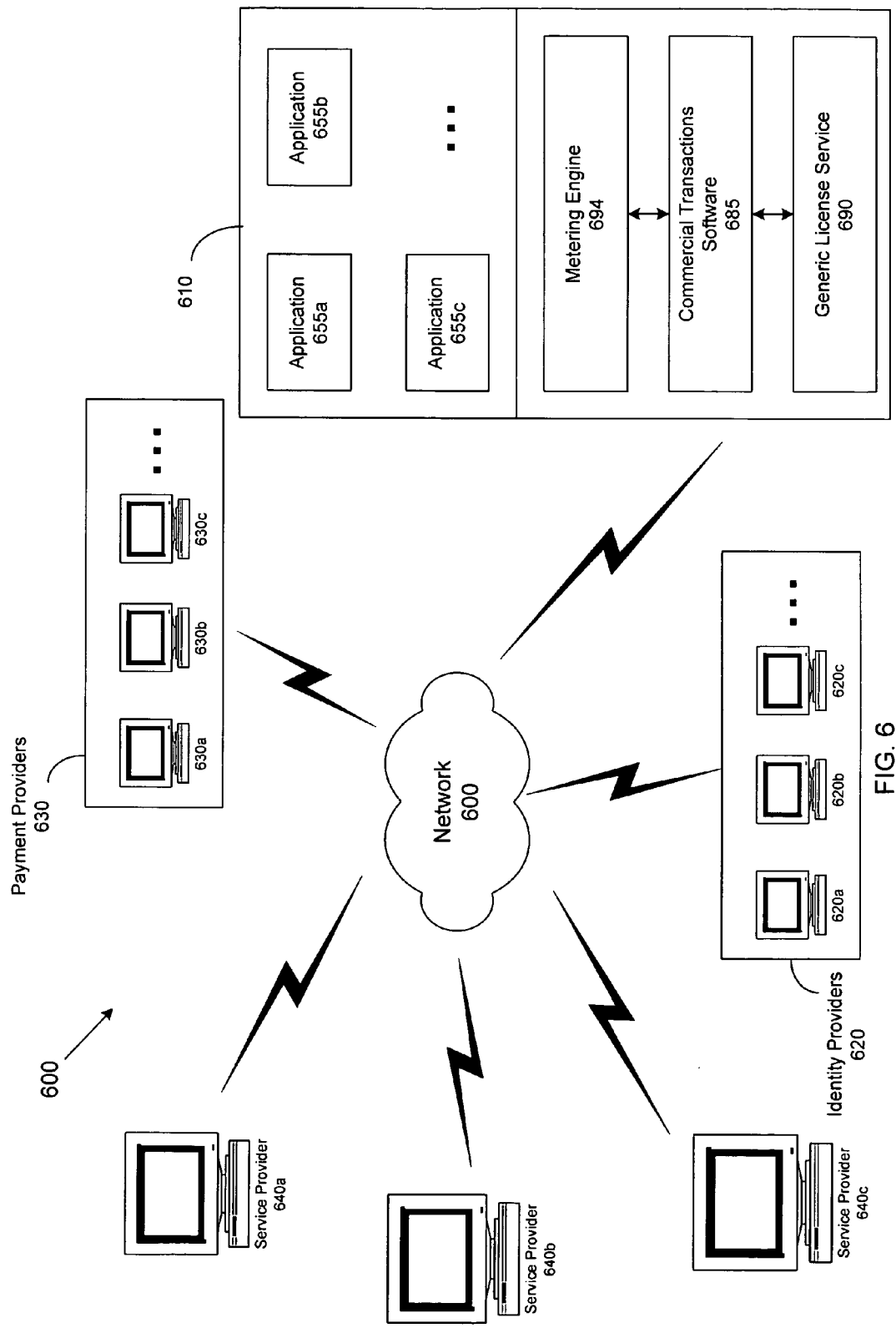
FIG. 6 illustrates a networked computer system for conducting licensing for applications installed on an end-user computer, wherein the license is obtained via an online transaction, in accordance with one embodiment of the present invention.

Applicant has appreciated the benefits of enabling an end-user to utilize software in a pay-as-you-go environment. In particular, an end-user may be charged only for the amount of time spent using the application, rather than paying the retail price for the software (where many of the features and/or the application would go largely unused). FIG. 6 illustrates a networked computer system having a commercial transaction framework that allows an end-user to pay for the amount of time spent using the application. Networked computer system 600 includes a network 605 interconnecting end-user node 610 to a plurality of identity providers 620, a plurality of payment providers 630, and plurality of service providers 640.

End-user node 610 may be a computer running on an operating system 695. Installed on the end-user computer may be a plurality of software applications 655. The software applications may have come bundled with the computer at purchase, may have been downloaded freely over a network, or otherwise distributed (often for free or for a nominal charge, or for registering with the vendor) by the seller of the application. Application 655 may be any type of application and any number of applications may be installed on the computer. Service providers 640 may be associated with one or more applications installed on end-user computer 610. For example, service provider 640a may be one or more computers owned by the developer and seller of application 655a. Similarly, service providers 640b and 640c may be associated with applications 655b and 655c, respectively.

In the pay-as-you-go model, the service provided by the service providers is a license to use the associated applications installed on the computer. For example, when software (e.g., applications 655) is freely distributed, it may be initially disabled so that users cannot run the application without first obtaining a license from the seller of the application. The license may be obtained by initiating a commercial transaction with one or more of the service providers 640. For example, application 655a may be a desktop publishing application that an end-user would like to use for a couple hours to design a card or brochure. When the end-user opens application 655a, the end-user is notified that the end-user needs to purchase a license to use the application. For example, a dialogue box may appear listing the characteristics and prices of the various for-use licensing capabilities.

A license may be for a specified amount of time, for example, an hour or a day. The license may expire once the application has been closed down, or the license could remain active until the term has expired. The license could be based on operations or tasks that allow an end-user to complete one or more jobs or employ one or more desired features. Additional features to be used may increase the cost of the license. It should be appreciated that a license having any desired terms may be negotiated, as the aspects of the invention are not limited in this respect.

Once the end-user has selected a license option, the end-user may be instructed to select an identity provider and payment provider, or one or the other may be selected by default to initiate an online transaction. The transaction may be handled by commercial transaction software 685 substantially as described in any of the foregoing embodiments. When service provider receives a payment token from one of the payment providers 620, the service provider may transmit a license according to the terms agreed upon at the initiation of the transaction.

The received license may be processed by generic license service 690 so that the appropriate accessibility to the application may be invoked. The generic license service may then issue an enable key to application 655 so that the user may run the software and utilize its functionality according to the license. The enable key may include any information the application may need to provide the necessary services for the term indicated in the license. The enable key may include a password provided by the service provider such that the application knows that the license is valid and/or may simply rely on the representation from generic license service 690 that a valid license has been obtained. Once the application is operating, metering engine 694 may be notified to keep track of time and to indicate to the application when the license has expired. Alternatively, the application may be programmed to periodically query the metering engine and then disable itself when the license has expired. Moreover, by querying the metering engine, the application may give periodic warnings or updates to the user about the amount of time remaining in the purchased license, should the licensse include a term.

When the end-user is finished he may choose to have the completed product professionally printed and select a print option that initiates another online transaction such as the transaction described in connection with FIG. 5. The pay-as-you-go license may provide users with much more flexibility and give them access to software that they would not have had prior access to due to the cost of buying the software package with a lifetime license. In addition, software vendors can capitalize on revenue from user's who were unwilling to pay full retail price, but willing to pay for limited use and/or limited functionality.

Software piracy impacts profits across the entire software industry. User's of unlicensed software cost businesses relatively substantial amounts each year. Once a software product has been purchased, the seller has little control over where and to how many computers the software is installed. Illegally providing software for download over the Internet provides an even more pervasive method to distribute and obtain software that the end-user has not paid for. Applicant has appreciated that providing a relatively secure and simple commercial transactions framework with a pay as you go license scheme, for example, the framework described in the embodiment illustrated in FIG. 6, may mitigate or eliminate the piracy problems. Since the software is distributed freely by the seller, end-users can appropriate the software anyhow they see fit. Since the software is enabled only through paying for a term license or task license, end-users are substantially limited in their ability to misuse the software.

As should be appreciated from the foregoing, there are numerous aspects of the present invention described herein that can be used independently of one another, including the aspects that relate to identity tokens, payment tokens, selecting one of a number of identity providers, selecting one of a number of payment providers, and the presence of commercial transaction software on an end-user system, a service provider system, an identity provider system, and a payment provider system. It should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation. Accordingly, the foregoing description and drawings are by way of example only.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A method of authorizing an online transaction between a purchaser and a merchant over a network interconnecting a purchaser computer and a merchant computer, respectively, the method comprising acts of:

transmitting an order from the purchaser computer to the merchant computer indicating one or more goods and/or services the purchaser intends to purchase;

receiving a first request at the purchaser computer from the merchant computer to provide verification of an identity of the purchaser;

requesting by the purchaser computer an identity token from an identity provider computer connected to the network, the identity token providing verification of the identity of the purchaser, wherein the identity token includes a predetermined interval of time during which the identity token can be processed, and wherein the identity token is considered invalid when the predetermined interval of time expires;

receiving at the purchaser computer the identity token from the identity provider;

receiving a second request at the purchaser computer from the merchant computer to provide verification of an ability of the purchaser to pay for the transaction; and requesting by the purchaser computer a payment token from a payment provider computer connected to the network, the payment token indicating the ability of the purchaser to pay for the transaction, wherein the payment token includes a predetermined interval of time during which the payment token can be processed, wherein the payment token is considered invalid when the predetermined interval of time expires, wherein requesting the payment token includes providing the identity token to the payment provider computer;

wherein the identity provider computer and the payment provider computer are different network entities;

wherein the method further comprising an act of providing, via the purchaser computer, identification information to facilitate the identity provider computer in verifying the identity of the purchaser; and wherein the act of providing identification information includes an act of providing a subscriber identity module (SIM) number, a network address, or a unique hardware identification (ID).

2. The method of claim 1, wherein the act of providing identification information includes providing identification information programmatically, via the purchaser computer, the identification information provided upon an indication by at least one application operating on the purchaser computer that the purchaser intends to make a purchase.

3. The method of claim 1, wherein the identity provider computer is associated with a bank or a government agency.

4. A computer system having a plurality of nodes interconnected via a network, the computer system programmed to conduct an online transaction between a purchaser and a merchant, the computer system comprising:

a purchaser node programmed to providing an order indicating a desire for a purchaser associated with the purchaser node to make a purchase;

a merchant node programmed to receiving the order;

an identity provider node programmed to provide an identity token verifying an identity of the purchaser, wherein the identity token includes a predetermined interval of time during which the identity token can be processed, and wherein the identity token is considered invalid when the predetermined interval of time expires; and a payment provider node programmed to provide a payment token verifying an ability of the purchaser to pay for the transaction, wherein the payment token includes a predetermined interval of time during which the payment token can be processed, wherein the payment token is considered invalid when the predetermined interval of time expires, wherein the identity provider node and the payment provider node are associated with different network entities;

wherein, during an online transaction, the merchant node requests that the purchaser node provide identity verification and the purchaser node requests that the identity provider node provide the identity token, and wherein, during the online transaction, the merchant node requests that the purchaser node provide payment verification and the purchaser node requests that the payment provider node provide the payment token at least in part by providing the payment provider node with the identity token, and wherein the merchant node begins processing the transaction upon receipt of the payment token;

wherein the purchaser node is programmed to provide identification information to facilitate the identity provider node in verifying the identity of the purchaser; and wherein the purchaser node provides a subscriber identity module (SIM) number, a network address, or a unique hardware identification as the identification information.

5. The computer system of claim 4, wherein the purchaser node includes an end-user computer that provides the identification information programmatically when a signal to initiate the transaction is issued by at least one application operating on the end-user computer.

6. The computer system of claim 4, wherein the payment provider node provides verification of the ability of the purchaser to pay only after the identity provider node verifies the identity of the purchaser.

7. The computer system of claim 6, wherein the payment provider node employs the identity token to perform the payment verification.

8. The computer system of claim 4, wherein the identity provider node is associated with a network entity that is a bank or a government agency.

* * * * *